(12) United States Patent
Huang

(10) Patent No.: US 10,995,022 B2
(45) Date of Patent: May 4, 2021

(54) MIXED ALUMINUM (III) AND IRON (II) SALT SOLUTION FOR ENHANCING THE HYBRID ZERO-VALENT IRON MEDIA SYSTEM REACTIVITY FOR TREATING METAL-CONTAMINATED WASTEWATER

(71) Applicant: The Texas A&M University System, College Station, TX (US)

(72) Inventor: Yongheng Huang, College Station, TX (US)

(73) Assignee: The Texas A&M University System, College Station, TX (US)

( * ) Notice: Subject to any disclaimer, the term of this patent is extended or adjusted under 35 U.S.C. 154(b) by 0 days.

(21) Appl. No.: 16/490,028

(22) PCT Filed: Mar. 12, 2018

(86) PCT No.: PCT/US2018/021945
§ 371 (c)(1),
(2) Date: Aug. 29, 2019

(87) PCT Pub. No.: WO2018/165650
PCT Pub. Date: Sep. 13, 2018

(65) Prior Publication Data
US 2020/0010343 A1     Jan. 9, 2020

Related U.S. Application Data

(60) Provisional application No. 62/470,036, filed on Mar. 10, 2017.

(51) Int. Cl.
*C02F 1/52* (2006.01)
*C02F 1/70* (2006.01)
(Continued)

(52) U.S. Cl.
CPC ............ *C02F 1/705* (2013.01); *C02F 1/5245* (2013.01); *C02F 2101/103* (2013.01);
(Continued)

(58) Field of Classification Search
CPC .. C02F 1/5245; C02F 1/705; C02F 2103/001; C02F 2103/06; C02F 2103/10; C02F 2103/18; C02F 2103/365
See application file for complete search history.

(56) References Cited

U.S. PATENT DOCUMENTS 5,089,141 A    2/1992  Murphy
6,454,962 B1   9/2002  Sesay et al.
(Continued)

OTHER PUBLICATIONS

International Search Report and Written Opinion dated May 24, 2018, issued in corresponding International Application No. PCT/US2018/21945, filed Mar. 12, 2018, 11 pages.

*Primary Examiner* — Bradley R Spies
(74) *Attorney, Agent, or Firm* — Christensen O'Connor Johnson Kindness PLLC

(57) ABSTRACT

Methods for reducing the concentration of one or more contaminants in water using zero-valent iron media. In the method, a mixed aluminum (III) and iron (II) salt solution is added to water containing one or more contaminants that is in contact with a zero-valent iron media that comprises (a) a reactive solid comprising zero-valent iron and one or more iron oxide minerals in contact therewith and (b) magnetite to provide an aqueous reaction medium. The aqueous reaction medium is contacted with the zero-valent iron media for a period of time sufficient to reduce the concentration of one or more of the contaminants.

20 Claims, 1 Drawing Sheet

(51) Int. Cl.
*C02F 101/10* (2006.01)
*C02F 101/12* (2006.01)
*C02F 101/20* (2006.01)
*C02F 101/22* (2006.01)
*C02F 103/00* (2006.01)
*C02F 103/10* (2006.01)
*C02F 103/18* (2006.01)
*C02F 103/36* (2006.01)
C02F 101/16 (2006.01)
C02F 103/06 (2006.01)

(52) U.S. Cl.
CPC .... *C02F 2101/106* (2013.01); *C02F 2101/12* (2013.01); *C02F 2101/163* (2013.01); *C02F 2101/20* (2013.01); *C02F 2101/22* (2013.01); *C02F 2103/001* (2013.01); *C02F 2103/06* (2013.01); *C02F 2103/10* (2013.01); *C02F 2103/18* (2013.01); *C02F 2103/365* (2013.01)

(56) References Cited

U.S. PATENT DOCUMENTS

| | | |
|---|---|---|
| 10,329,179 B2 | 6/2019 | Huang |
| 10,377,648 B2 | 8/2019 | Huang et al. |
| 2011/0036772 A1 | 2/2011 | Banerjee et al. |
| 2011/0174743 A1 | 7/2011 | Huang |
| 2017/0129792 A1 | 5/2017 | Huang et al. |
| 2017/0233272 A1 | 8/2017 | Chidambaran et al. |

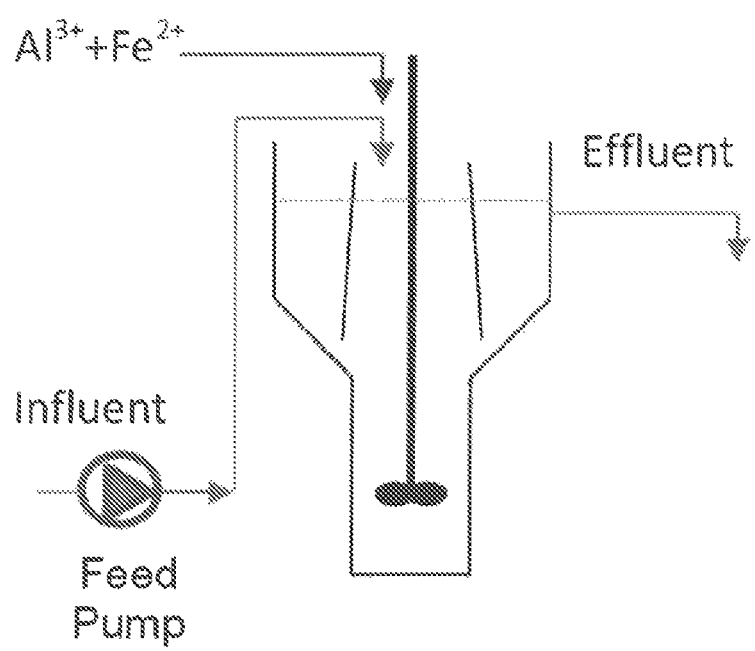

MIXED ALUMINUM (III) AND IRON (II) SALT SOLUTION FOR ENHANCING THE HYBRID ZERO-VALENT IRON MEDIA SYSTEM REACTIVITY FOR TREATING METAL-CONTAMINATED WASTEWATER

CROSS-REFERENCES TO RELATED APPLICATIONS

This application is the national stage of International Application No. PCT/US2018/021945, filed Mar. 12, 2018, which claims the benefit of U.S. Application No. 62/470,036, filed Mar. 10, 2017, which applications are expressly incorporated herein by reference in their entirety.

BACKGROUND OF THE INVENTION

Two major industrially available technologies for the removal of selenium from water are biological treatments and zero-valent iron (ZVI) technology. Biological treatment requires a large footprint and it cannot remove the reduced form of selenium, selenocyanate. ZVI technology can remove selenium in different oxidation states through redox reactions, adsorption, and co-precipitation in a reactor. However, surface corrosion of ZVI can form oxide and other compounds that passivate the ZVI surfaces, diminishing ZVI reactivity with respect to the target contaminants, and eventually causing the reactions to stop altogether. The lack of a viable method to overcome the ZVI surface passivation has caused attempts to develop ZVI technology into a reliable selenium removal solution to be substandard.

By introducing Fe(II) into ZVI surface corrosion reactions as a mediating agent, the formation of passivating iron oxides, such as "red rust" ($Fe_2O_3$) is mitigated. Fe(II) mediation leads to formation of magnetite ($Fe_3O_4$), a mixed Fe(II) and Fe(III) electron-conducting iron oxide that helps mediate rapid redox reactions between ZVI and contaminants. Magnetite is capable of conducting electrons from the corroding ZVI surface while avoiding the surface passivation experienced with traditional ZVI treatment. Fe(II) serves as a partial electron donor for selenate reduction.

Thus, in a hybrid zero-valent iron (hZVI) system (i.e., Fe(II) introduced as corrosion-mediating agent), the reactive media includes three components: magnetite-coated ZVI, discrete magnetite crystalline, and dissolved or surface-bound Fe(II). In the hZVI system, the needed Fe(II) is often provided externally by augmenting ferrous salt solution as a reagent into the reactor system.

After many years of research and development effort on the hybrid ZVI/FeOx/Fe(II) system (traditional hZVI system), two areas have been identified that, if improved, could further strengthen the advantages of the hZVI technology over other technologies, especially in the application of treating selenium-contaminated flue gas desulfurization (FGD) wastewater for the coal-fired power industry. The first is to shorten the required reaction time for the reduction of selenate, a common and toxic contaminant, by the reactive iron media. The second is to achieve selective reduction of selenate and other metal/metalloid oxyanions, without or with limited reduction of nitrate, a common co-contaminant, by the reactive iron media.

The capability of selective reduction is desirable because in the applications for treating wastewater with high nitrate concentrations, allowing the activated iron media to completely reduce nitrate would result in several undesirable consequences including consumption of large quantity of ZVI media, which will shorten the media life and increase the operation costs; production of large quantity of iron oxides, which may overwhelm the system and disrupt its normal operation; stoichiometric production of ammonia from nitrate means that ammonia concentration may be very high in the treated effluent and may exceed the limit imposed by local or states in many cases; and a slower reduction of selenate due to competition of nitrate reduction and thus a longer retention time or more treatment stages may be required.

Despite the advances in hZVI media systems for effective decontamination of wastewaters, a need exist for improved hZVI media systems that address these shortcomings. The present invention seeks to fulfill this need and provides further related advantages.

SUMMARY OF THE INVENTION

In one aspect, the invention provides methods for reducing the concentration of one or more contaminants. In one embodiment, the method includes adding a mixed aluminum (III) and iron (II) salt solution to water containing one or more contaminants in contact with a zero-valent iron media comprising (a) a reactive solid comprising zero-valent iron and one or more iron oxide minerals in contact therewith and (b) magnetite (e.g., discrete magnetite, magnetite particles) to provide an aqueous reaction medium, and mixing the aqueous reaction medium for a period of time sufficient to reduce the concentration of one or more of the contaminants.

In the methods, the mixed aluminum (III) and iron (II) salt solution is formed from dissolving an aluminum (III) salt and an iron (II) salt in water. In certain embodiments, the molar ratio of aluminum (III) to iron (II) in the mixed aluminum (III) and iron (II) salt solution is from about 1:100 to about 100:1. In certain embodiments, the molar ratio of aluminum (III) to iron (II) in the mixed aluminum (III) and iron (II) salt solution is 1:2.

In certain embodiments, the mixed aluminum (III) and iron (II) salt solution is added continuously. In certain embodiments, when the method is carried out in a continuous flow reactor and the water influent flow rate is about 1.0 L/hr, the mixed aluminum (III) and iron (II) salt solution is added at a flow rate of about 0.010 L/hr.

In certain embodiments, the one or more iron oxide minerals of the reactive solid comprise magnetite. In certain embodiments, the reactive solid comprises a plurality of particles.

The methods of the invention can be carried out in a reactor. In these embodiments, adding the mixed aluminum (III) and iron (II) salt solution to the water containing one or more contaminants in contact with a zero-valent iron media occurs in a reactor. In certain embodiments, the reactor is a packed bed or a fluidized bed. In certain embodiments, the reactor is continuous-flow reactor. In certain embodiments, the method further includes conducting an effluent from the reactor, wherein the concentration of one or more contaminants in the effluent is less than the concentration of one or more contaminants in the influent water.

In certain embodiments, the methods of the invention further include a pre-conditioning step comprising, treating zero-valent iron with a solution comprising an oxidant (e.g., aqueous nitrate) and ferrous iron to provide the zero-valent iron media.

Contaminants that are effectively removed or their concentrations reduced by the methods of the invention include arsenic, aluminum, antimony, beryllium, cobalt, lead, cadmium, chromium, silver, zinc, nickel, molybdenum, thallium, vanadium, and ions and oxyanions thereof; borates, nitrates, bromates, iodates, and periodates; and mixtures thereof. In certain embodiments, the contaminant is selenate.

Contaminated waters treatable by the methods of the invention include flue gas desulfurization wastewater, industrial waste stream, oil refinery waste, tail water of a mining operation, stripped sour water, surface water, ground water, and influent stream.

In another aspect, the invention provides a method for selectively reducing the concentration of selenate in the presence of nitrate in a water containing selenate and nitrate. In one embodiment, the method includes adding a mixed aluminum (III) and iron (II) salt solution to water containing one or more contaminants in contact with a zero-valent iron media comprising (a) a reactive solid comprising zero-valent iron and one or more iron oxide minerals in contact therewith and (b) magnetite (e.g., discrete magnetite, magnetite particles) to provide an aqueous reaction medium, and mixing the aqueous reaction medium for a period of time sufficient to selectively reduce the concentration of selenate in the presence of nitrate.

DESCRIPTION OF THE DRAWINGS

The foregoing aspects and many of the attendant advantages of this invention will become more readily appreciated as the same become better understood by reference to the following detailed description, when taken in conjunction with the accompanying drawing.

FIG. 1 is a schematic illustration of a representative single-stage zero-valent iron wastewater treatment system.

DETAILED DESCRIPTION OF THE INVENTION

In one aspect of the invention, methods for reducing the concentration of one or more contaminants in water are provided. In one embodiment, the method includes adding a mixed aluminum (III) and iron (II) salt solution to water containing one or more contaminants in contact with a zero-valent iron media comprising (a) a reactive solid comprising zero-valent iron and one or more iron oxide minerals in contact therewith and (b) magnetite (e.g., discrete magnetite, magnetite particles such as formed in situ by a zero-valent iron pre-conditioning step as described herein) to provide an aqueous reaction medium, and mixing the aqueous reaction medium for a period of time sufficient to reduce the concentration of one or more of the contaminants.

As used herein, the term "a mixed aluminum (III) and iron (II) salt solution" refers to solution prepared by dissolving an aluminum (III) salt and an iron (II) salt in water. The nature of the aluminum and iron salts useful in the method are not particularly critical so long as the salts have an appreciable solubility in water and do not otherwise interfere with the reduction of contaminant concentration by the zero-valent iron media. Representative aluminum (III) salts include aluminum chloride, aluminum sulfate, aluminum fluoride, aluminum bromide, aluminum iodide, aluminum nitrate, aluminum phosphate, aluminum carboxylates (e.g., formate, citrate, lactate, oxalate), and mixtures thereof. Representative iron (II) salts include ferrous chloride, ferrous sulfate, ferrous bromide, ferrous fluoride, ferrous iodide, ferrous carboxylates (e.g., formate, citrate, lactate, oxalate), and mixtures thereof.

The mixed aluminum (III) and iron (II) salt solution includes both aluminum (III) and iron (II) salts. The molar ratio of aluminum (III) to iron (II) can be varied. For example, in certain embodiments, the molar ratio of aluminum (III) to iron (II) is about 1:100 (e.g., 1:90, 1:80, 1:70, 1:60, 1:50, 1:40, 1:30, 1:20, 1:10). In other embodiments, the molar ratio of aluminum (III) to iron (II) is about 1:10 (e.g., 1:9, 1:8, 1:7, 1:6, 1:5, 1:4, 1:3, 1:2, 1:1). In certain embodiments, the molar ratio of iron (II) to aluminum (III) is about 1:100 (e.g., 1:90, 1:80, 1:70, 1:60, 1:50, 1:40, 1:30, 1:20, 1:10). In other embodiments, the molar ratio of iron (II) to aluminum (III) is about 1:10 (e.g., 1:9, 1:8, 1:7, 1:6, 1:5, 1:4, 1:3, 1:2, 1:1).

In certain embodiments of the mixed aluminum (III) and iron (II) salt solution, the molar ratio of aluminum (III) to iron (II) is from about 0.05:1 to about 3:1. In one embodiment, the molar ratio of aluminum (III) to iron (II) is about 0.5:1. In another embodiment, the molar ratio of aluminum (III) to iron (II) is about 1:1. In a further embodiment, the molar ratio of aluminum (III) to iron (II) is about 1:2. In yet another embodiment, the molar ratio of aluminum (III) to iron (II) is about 3:1.

In certain embodiments of the mixed aluminum (III) and iron (II) salt solution, the molar ratio of iron (II) to aluminum (III) is from about 0.05:1 to about 3:1. In one embodiment, the molar ratio of iron (II) to aluminum (III) is about 0.5:1. In another embodiment, the molar ratio of iron (II) to aluminum (III) is about 1:1. In a further embodiment, the molar ratio of iron (II) to aluminum (III) is about 1:2. In yet another embodiment, the molar ratio of iron (II) to aluminum (III) is about 3:1.

In certain embodiments of the mixed aluminum (III) and iron (II) salt solution, the concentration of aluminum (III) is from about 50 to about 200 mM. In other embodiments, the concentration of aluminum (III) is about 50 mM. In certain embodiments, the concentration of iron (II) is from about 50 to about 200 mM. In other embodiments, the concentration of iron (II) is about 100 mM. In one embodiment, the concentration of aluminum (III) is about 50 mM and the concentration of iron (II) is about 100 mM.

In certain embodiments, the mixed aluminum (III) and iron (II) salt solution is added continuously to the aqueous reaction medium. As used herein "aqueous reaction medium" refers to the water contaminated with one or more contaminants in contact with the zero-valent iron media. It will be appreciated that in the practice of the invention, after commencement of the addition of the mixed aluminum (III) and iron (II) salt solution, the aqueous reaction medium may include aluminum (III) and iron (II) salts (i.e., Al(III), Fe(II) and their counter ions).

When the method is carried out in a continuous flow reactor and the water influent flow rate is about 1.0 L/hr, the mixed aluminum (III) and iron (II) salt solution is added at a flow rate of about 0.010 L/hr. In general, the flow rate of addition of the mixed aluminum (III) and iron (II) salt solution (about 100 mM iron (II)) will be about 100× less than the water influent flow rate.

As used herein, the term "about" refers to +/−5% of the recited value.

In the methods, in certain embodiments, the one or more iron oxide minerals of the reactive solid include magnetite. The reactive solid comprises a plurality of particles.

In certain embodiments, the method further comprises a pre-conditioning step. In one embodiment, pre-conditioning step includes treating zero-valent iron with a solution comprising an oxidant (e.g., aqueous nitrate) and ferrous iron to provide the zero-valent iron media.

The methods of the invention are effective for removing contaminants from water. Contaminants that are effectively removed or their concentrations reduced by the method include contaminants that are subject to reduction by the zero-valent iron media. Representative such contaminants include arsenic, aluminum, antimony, beryllium, cobalt, lead, cadmium, chromium, silver, zinc, nickel, molybdenum, thallium, vanadium, and ions and oxyanions thereof; borates, nitrates, bromates, iodates, and periodates; and mixtures thereof; oxyanions and chlorinated organic compounds. In certain embodiments, the contaminant is selenate.

The nature of the contaminated water effectively treatable by the methods include flue gas desulfurization wastewater, industrial waste stream, oil refinery waste, tail water of a mining operation, stripped sour water, surface water, ground water, and an influent stream. In certain embodiments, the water is flue gas desulfurization wastewater.

As described in detail below, in another aspect, the invention provides a method for selectively reducing the concentration of selenate in the presence of nitrate in a water containing selenate and nitrate. In one embodiment, the method includes adding a mixed aluminum (III) and iron (II) salt solution to water containing one or more contaminants in contact with a zero-valent iron media comprising (a) a reactive solid comprising zero-valent iron and one or more iron oxide minerals in contact therewith and (b) magnetite to provide an aqueous reaction medium, and mixing the aqueous reaction medium for a period of time sufficient to selectively reduce the concentration of selenate in the presence of nitrate.

In the practice of the methods of the invention, the addition of a mixed aluminum (III) ($Al^{3+}$) and iron (II) ($Fe^{2+}$) solution to zero-valent iron media (a combination of magnetite and a reactive solid comprising zero-valent iron and one or more iron oxide minerals in contact therewith) addresses several of the problems of traditional hZVI media systems. First, while traditional hZVI media systems require relatively long reaction times, often as long as 12 hr, to meet the strict selenium limits encountered when treating more challenging wastewater, such as the FGD wastewater, the hZVI media system of the present invention affords substantially complete selenium reduction in reaction times as short as 2 hr. Second, while traditional hZVI media systems suffer from the consumption of relatively large amounts of ZVI due to competitive nitrate reduction reaction in nitrate-containing wastewater, the hZVI media system of the present invention provides an operational regime that bypasses nitrate reduction reaction and affords selective selenate removal. The present invention also affords a more compact hZVI treatment system having higher performance and lower cost for treating wastewaters.

Without being bound to theory, it is believe that in the practice of the present method the co-precipitation of Al(III) and Fe(II) onto the iron oxide surface and their subsequent incorporation into the magnetite crystalline structure plays a key role in maintaining and enhancing the media reactivity. By controlling the ratio of Al(III) to Fe(II) and its dosage into the reactor, the direct and simultaneously deposition of both Al(III) and Fe(II) onto the iron oxide crystalline surface is encouraged and facilitates the formation of crystalline, Al(III)-embedded magnetite phase that can support high reactivity of the media with respect to selenate and nitrate reduction.

The ZVI media useful in the methods of the invention is new in that the non-ZVI solid phase in the system now incorporates aluminum into its structure. Consequently, the physicochemical properties of oxide solid phases are significantly changed, which may account for improved reactivity of the hZVI reactive mixture for selenate reduction and a decreased/suppressed reactivity with respect to nitrate reduction under certain aquatic chemical conditions.

Thus, in certain aspects, the present invention is an improvement of traditional hZVI system, which utilizes ferrous iron (Fe(II), $Fe^{2+}$) as the dosing reagent, by replacing the dosing reagent with a mixed aluminum (III) $Al^{3+}$ and iron (II) ($Fe^{2+}$) solution (also referred to herein as "a mixed aluminum (III) ($Al^{3+}$) and iron (II) ($Fe^{2+}$) reagent").

The method of the invention can be practiced in a reactor (e.g., adding the mixed aluminum (III) and iron (II) salt solution to the water containing one or more contaminants in contact with a zero-valent iron media contained in a reactor). The reactor can include a packed bed or a fluidized bed of the zero-valent iron media, means for mixing the contaminated water and zero-valent iron media (e.g., stirrer), and central flow conduit submerged below the level of the aqueous reaction medium when the method is practiced to create circular flow of the aqueous reaction medium in the reactor, which flow enhances the effectiveness of the method. In one embodiment, the reactor is continuous-flow reactor. In view of the advantageous effectiveness of the present method, a single-stage reactor system can be used (i.e., one reactor). Alternatively, the method of the invention can be practiced in a multi-stage reactor system that includes two, three, four, or more reactors arranged, for example, in series. The method can include conducting an effluent from the reactor, wherein the concentration of one or more contaminants in the effluent is less than the concentration of one or more contaminants in the influent water. A representative single-stage reactor system of the invention is illustrated schematically in FIG. 1.

Thus, in another aspect, the invention provides a system for removing or reducing the concentration of one or more contaminants in water. In one embodiment, the system comprises a reactor adapted for receiving influent water comprising one or more contaminants and for contacting the water with a zero-valent iron media comprising (a) a reactive solid comprising zero-valent iron and one or more iron oxide minerals in contact therewith, and (b) magnetite to provide an aqueous reaction medium. The reactor is also adapted for receiving and dosing aqueous reaction medium with a mixed aluminum (III) ($Al^{3+}$) and iron (II) ($Fe^{2+}$) salt solution. In certain embodiments, the reactor is a continuous-flow reactor.

Exemplary zero-valent iron treatment systems useful in carrying out the methods of the invention include those described in US 2011/0174743 and US 2012/0273431, each expressly incorporated herein by reference in its entirety. Single-stage and multiple-stage reactor systems can be used.

In some embodiments, the system is a single-stage reactor system and includes a single reactor (e.g., a fluidized bed reactor). In other embodiments, the system is a multiple-stage reactor system and includes two or more reactors. The systems may further include one or more of the following: an internal solid/liquid separating zone (e.g., settling zone), an aerating basin, a settling basin, and a filtration bed.

The method of the invention can be carried out in a Pironox® system, such as described in U.S. application Ser. No. 15/355,927, filed Nov. 18, 2016, expressly incorporated herein by reference in its entirety.

Advantages of the hZVI System with $Al^{3+}/Fe^{2+}$

Aluminum salts are commonly available and already widely used in water/wastewater treatment. The new system with $Al^{3+}/Fe^{2+}$ demonstrates its exceptional high efficiency in decreasing selenate to a very low concentration. In many applications, in particular with treating selenate contaminated industrial wastewater, removal of selenium is the control reaction of the slowest step. With the greatly accelerated selenate reduction, the modified system could greatly reduce the overall treatment time. For example, for treating the FGD wastewater, it might be possible now for the modified system to meet the strict Se limit at low ppb level in as short as 2 hr reaction time with no more than 2 treatment stages. In comparison, for the original hZVI system, a three or four stage treatment system with reaction time of over 12 hr is typically required when treating the more challenging FGD wastewater. Such improvement could greatly improve the competitiveness of the new technology in all aspects: reducing the footprint, lowering the initial capital costs, and reducing operating costs.

Representative Testing of hZVI with Mixed Al(III) and Fe(II) Salt Reagent

The following is a description of the effectiveness of the method and system of the present invention that uses a mixed Al(III) and Fe(II) salt reagent to enhance the hZVI media system reactivity for treating metal-contaminated wastewater.

The following describes a series of laboratory tests, mainly through the continuous-flow-through reactor treatment tests, to evaluate the effectiveness of using the mixed Al(III) and Fe(II) salt solution to activate and enhance the hZVI media's reactivity with respect to selenite and nitrate removal from an impaired (i.e., contaminated) wastestream.

Materials. Zero-valent iron source: 325 mesh commercial ZVI powder (>98% purity, <44 μm);

Sodium selenate, sodium nitrate, $AlCl_3$ and $FeCl_2$ of reagent grade were all purchased from research chemical suppliers.

Reactors. For the continuous-flow test, a single-stage 6-liter hZVI reactor was operated under designed conditions to treat simulated and real wastewater. For continuous-flow test, the system was started with adding 600 g fresh ZVI to the reactor (i.e., 100 g/L ZVI concentration). A pre-conditioning procedure (the nitrate-ferrous iron method, see US 2011/0174743 and US 2012/0273431, each expressly incorporated by reference in its entirety) was used to convert a ZVI system into a hybrid $ZVI/Fe_3O_4$ system. Upon the completion of the precondition procedure, the media in the reactor consisted of about 550 g of magnetite-coated ZVI powder and 80 g of discrete magnetite crystalline. The hZVI system was then used to treat simulated wastewater and real FGD wastewater.

Routine Water Quality Analyses. Common water quality parameters such as pH, DO (dissolved oxygen), ORP (oxidation reduction potential), TDS (total dissolved salts) and common cation ($Ca^{2+}$, $Mg^{2+}$, $Na^+$, $NH_4^+$, and $Fe^{2+}$) and anion ($Cl^-$, $SO_4^{2-}$, $NO_3^-$) constituents in water were analyzed using methods accepted by the USEPA.

Selenate and nitrate were analyzed using a Dionex DX500 Ion Chromatography that is equipped with a conductivity detector (CD20) and an autosampler (AS50). Dionex IonPac AS22 separation columns was used for selenate and nitrate ion analyses. The detection limit is about 0.02 mg/L for both selenate and nitrate. To determine Se concentration at a lower value, a Hydride-Generation Atomic Absorption Spectroscopy (Perkin Elmer AAnalyst 400 model) was used, which reported a detection limit of about 1 ug/L for total Se.

In these tests, the concentration of selenium compounds is reported as Se concentration and nitrate or ammonia was both reported as N concentration.

Wastewater. Both synthetic wastewater and real FGD wastewater were used in these tests. The synthetic wastewater was made by dissolving known chemicals according to experimental design to simulate the composition and characteristics of the wastewater.

Continuous-flow treatment tests. The continuous-flow tests were conducted on a bench-top one-stage treatment system. The flow chart of the treatment system is illustrated in FIG. 1 and summarized as:

Feed→Reactor 1 (6 L)→Effluent

In the following tests, the hydraulic retention time (HRT) was either 2 hr or 6 hr.

The following describes Tests I-VII and their results.

Test I. Comparison Between $Al^{3+}+Fe^{2+}$ vs. $Fe^{2+}$ Alone

Feed: Synthetic wastewater, prepared by spiking DI water with 20 mg/L nitrate-N and 5 mg/L selenate-Se.

Media preparation: Added 600 g 325-mesh fresh ZVI powder into reactor, media concentration in the reactor was 100 g/L.

Added 0.24 mol $NaNO_3$ (20.4 g)+0.17 mol $FeCl_2$ (33.3 g $FeCl_2.4H_2O$) into each reactor; allow the reactor to operate in batch mode for 24 hr to coat the fresh ZVI surface with $Fe_3O_4$ and also to produce sufficient amount of discrete $Fe_3O_4$ crystalline. Upon the complete of the preconditioning process, the media in each reactor consisted of approximately 560 g magnetite-coated ZVI+60 g $Fe_3O_4$ discrete particles.

Reagents and Dosages

Run A: 100 mM $FeCl_2$ stock solution; dosing at 1.5 mM $Fe^{2+}$ (conventional hZVI).

Run B: a mixed solution of 100 mM $FeCl_2$+50 mM $AlCl_3$; dosing 1.0 mM $Fe^{2+}$+0.5 mM $Al^{3+}$.

Influent flow rate: Q=1.0 L/hr with HRT=6 hr, or Q=3.0 L/hr with HRT=2 hr.

TABLE 1

Selenate and nitrate removal results of Test I (Run A vs. Run B) with HRT = 6 hr. All concentrations are in mg/L.

| Time | Influent Con. (mg/L) | | Run A, Effluent (mg/L) | | Run B, Effluent (mg/L) | |
|---|---|---|---|---|---|---|
| | Selenate | Nitrate | Selenate | Nitrate | Selenate | Nitrate |
| Day 1 | 5.0 | 20 | 0.18 | 2.3 | <0.02 | 0.8 |
| Day 2 | 5.0 | 20 | 0.25 | 2.5 | <0.02 | 0.7 |
| Day 3 | 5.0 | 20 | 0.16 | 2.6 | <0.02 | 1.0 |
| Day 4 | 5.0 | 20 | 0.24 | 2.4 | <0.02 | 0.6 |
| Day 5 | 5.0 | 20 | 0.19 | 2.4 | <0.02 | 0.7 |
| Avg. Removal % | | | 96% | 88% | >99% | 95% |

TABLE 2

Selenate and nitrate removal results of Test I (Run A vs. Run B) with HRT = 2 hr.

| Time | Influent Con. (mg/L) | | Run A, Effluent (mg/L) | | Run B, Effluent (mg/L) | |
|---|---|---|---|---|---|---|
| | Selenate | Nitrate | Selenate | Nitrate | Selenate | Nitrate |
| Day 1 | 5.0 | 20 | 0.65 | 9.0 | <0.02 | 2.7 |
| Day 2 | 5.0 | 20 | 0.78 | 10.7 | <0.02 | 3.0 |

TABLE 2-continued

Selenate and nitrate removal results of Test I
(Run A vs. Run B) with HRT = 2 hr.

| | Influent Con. (mg/L) | | Run A, Effluent (mg/L) | | Run B, Effluent (mg/L) | |
|---|---|---|---|---|---|---|
| Time | Selenate | Nitrate | Selenate | Nitrate | Selenate | Nitrate |
| Day 3 | 5.0 | 20 | 0.85 | 11.2 | <0.02 | 3.1 |
| Avg. Removal % | | | 84.8% | 48% | >99% | 85.3% |

The two tests Run A and B were conducted side-by-side under comparable conditions. Run B with adding a mixed solution of $Al^{3+}$ and $Fe^{2+}$ produced significantly better selenate and nitrate removal than Run A with $Fe^{2+}$ alone. In particular, selenate in the treated effluent is below 20 ppb with the use of the mixed $Al^{3+}/Fe^{2+}$ reagent, significantly better than over 500 ppb Se residual in the treated effluent from the conventional hZVI media treatment system.

Test II. Tests with Simulated Wastewater Having Additional Constituents

Feed: Synthetic wastewater, prepared by spiking local tap water with 20 mg/L nitrate-N and 5 mg/L selenate-Se. Note that, the local tap water contains about 25 mg/L dissolved silica (as $SiO_2$) in addition to various concentrations of $Na^+$, $Ca^{2+}$, chloride ion, sulfate, carbonate as normally found in groundwater.

Media preparation: hZVI media from Test I.

Reagents and Dosages

Run A: 100 mM $FeCl_2$; dosing at 1.5 mM $Fe^{2+}$ (conventional hZVI).
Run B: a mixed solution of 100 mM $FeCl_2$+50 mM $AlCl_3$; dosing 1.0 mM $Fe^{2+}$+0.5 mM $Al^{3+}$.
Influent flow rate: Q=1.0 L/hr with HRT=6 hr, or Q=3.0 L/hr with HRT=2 hr.

Results

At HRT=6 hr
Run A: about 60% nitrate removal+80% selenate removal
Run B: about 90% nitrate removal+>99% selenate removal (Se<0.02 mg/L)
At HRT=2 hr
Run A: about 30% nitrate removal+50% selenate removal
Run B: about 60% nitrate removal+>99% selenate removal (Se<0.02 mg/L)

When treating the synthetic wastewater prepared from tap water, the mixed solution of $Al^{3+}$ and $Fe^{2+}$ has produced significantly greater selenate and nitrate removal than the run with using $Fe^{2+}$ alone. Constituents in tap water could significantly decrease the media's effectiveness for nitrate removal, but no obvious impact on selenate removal as in both HRT 6 and 2 hr conditions, selenate was decreased to below 0.02 mg/L. The advantage of using mixed $Al^{3+}/Fe^{2+}$ over $Fe^{2+}$ alone was extraordinary as demonstrated by the different selenium removal in the short HRT 2 hr runs: selenate reduction was complete (<0.02 mg/L) with mixed $Al^{3+}/Fe^{2+}$, while there was about 2.5 mg/L Se remained in the treatment with $Fe^{2+}$ alone.

Test III. Tests with Simulated Wastewater with High Nitrate Concentration

Feed: Synthetic wastewater, prepared by spiking local Tap Water with 100 mg/L nitrate-N and 5 mg/L selenate-Se.

Media preparation: hZVI media from Test II.

Reagents and Dosages

A mixed solution of 100 mM $FeCl_2$+50 mM $AlCl_3$.
Run A: dosing 2.0 mM $Fe^{2+}$+1.0 mM $Al^{3+}$.
Run B: dosing 0.3 mM $Fe^{2+}$+0.15 mM $Al^{3+}$.
Influent flow rate: Q=1.0 L/hr with HRT=6 hr.

Results

Run A: At HRT=6 hr, the system achieved about 50% nitrate removal+99% selenate removal with a higher dosage of 2.0 mM $Fe^{2+}$+1.0 mM $Al^{3+}$.
Run B: At HRT=6 hr, the system achieve about 8% nitrate removal+99% selenate removal with a lower dosage of 0.3 mM $Fe^{2+}$+0.15 mM $Al^{3+}$.

When treating wastewater with extra high nitrate, the use of a mixed solution of $Al^{3+}$ and $Fe^{2+}$ achieved exceptional high selenate removal even though only partial removal of nitrate was achieved. By controlling the mixed salt dosage, it is possible to limit nitrate reduction to a relatively low rate (e.g., <10% conversion rate) while still maintaining a critically high removal rate of over 99% for selenate reduction. Selective selenate reduction over nitrate is attainable with the use of a mixed $Fe^{2+}/Al^{3+}$ reagent.

Test IV. Tests with Simulated Wastewater with High NaCl Concentration

Feed: Synthetic wastewater, prepared by spiking local tap water with 20 mg/L nitrate-N and 5 mg/L selenate-Se and 40,000 mg/L NaCl.
Media preparation: hZVI from Test III.

Reagents and Dosages

A mixed solution of 100 mM $FeCl_2$+50 mM $AlCl_3$; dosing 1.0 mM $Fe^{2+}$+0.5 mM $Al^{3+}$.
Influent flow rate: Q=1.0 L/hr with HRT=6 hr.

Results

At HRT=6 hr, the system achieved about 73% nitrate removal+99% selenate removal (Se<0.02 mg/L).

High total dissolved solids (TDS), in this case, NaCl, can slow down the overall reaction rate in the activated iron media treatment system. However, even with the high concentration of NaCl, the presence of chloride has no apparent impact on the effectiveness of the mixed $Al^{3+}$ and $Fe^{2+}$ reagent in achieving exceptionally high selenate removal efficiency.

Test V. Tests with Simulated Wastewater with High $Mn^{2+}$ Concentration

Feed: Synthetic wastewater, prepared by spiking local Tap Water with 20 mg/L nitrate-N and 5 mg/L selenate-Se and 25 mg/L $Mn^{2+}$ (as $MnCl_2$).
Media preparation: hZVI media from Test IV.

Reagents and Dosages

A mixed solution of 100 mM $FeCl_2$+50 mM $AlCl_3$; dosing 1.0 mM $Fe^{2+}$+0.5 mM $Al^{3+}$.

Influent flow rate: Q=1.0 L/hr, correspondingly, HRT=6 hr.

Results

At HRT=6 hr, the system achieved about 85% nitrate removal+99% selenate removal (Se<0.02 mg/L). $Mn^{2+}$ was decreased to below 2 mg/L, corresponding to over 90% removal.

The presence of high $Mn^{2+}$ was previously found to interfere with the function of hZVI reactive media, potentially significantly slowing down nitrate reduction by the hZVI. When using the mixed $Al^{3+}+Fe^{2+}$ solution as the supplementary (dosing) reagent, $Mn^{2+}$ was found to be rapidly removed while nitrate and selenate were both still effectively removed. With the use of $Al^{3+}$, it appears that $Mn^{2+}$ could be more effectively removed along with the precipitation of $Al^{3+}$.

Test VI. Tests with Real FGD Wastewater

Feed: 30 L real FGD wastewater with a TDS of about 12,000 mg/L (including mainly chloride, sulfate, $Na^+$, $Ca^{2+}$). The FGD wastewater contains about 16 mg/L nitrate-N and about 2.3 mg/L selenate-Se.

Media preparation: hZVI media from Test V.

Reagents and Dosages

A mixed solution of 100 mM $FeCl_2$+50 mM $AlCl_3$; dosing 1.0 mM $Fe^{2+}$+0.5 mM $Al^{3+}$.

Influent flow rate: Q=1.0 L/hr with HRT=6 hr.

Results

At HRT=6 hr, the system achieved about 70% nitrate removal+99% selenate removal (Se<0.02 mg/L).

The effectiveness of using the mixed $Al^{3+}+Fe^{2+}$ solution as the supplementary reagent was extended to the treatment of real FGD wastewater with various potential interfering factors and constituents. In a single stage, selenate was decreased from ppm level to below 20 ppb, achieving over 99% reduction of selenate in a single stage treatment. In the conventional hZVI system using $Fe^{2+}$ alone, a removal of 80%-90% removal was expected under comparable conditions according to several field FGD wastewater treatment tests; typically requiring over 3 stage 12 hr treatment to achieve 99% removal rate for selenium. The result shows that the method and system of the invention is very robust.

Test VII. Role of ZVI

Feed: Synthetic wastewater prepared by spiking tap water with 20 mg/L nitrate-N and 5 mg/L selenate-Se.

Media preparation: hZVI media from Test VI rinsed with DI water for 2 days to remove FGD wastewater (high dissolved salts) from the reactor before conducting this test.

Note: The speed of the mixing stirrer was slowed down from the full speed (1800 rpm) to around 500 rpm. Under the slower speed, most of the large ZVI grains would deposit at the reactor bottom and only the light FeOx phase were partially fluidized to mix with the feed wastewater and the augmented $Al^{3+}/Fe^{2+}$ reagent. Essentially, most of ZVI did not participate in the reactions in this test.

Reagents and Dosages

A mixed solution of 100 mM $FeCl_2$+50 mM $AlCl_3$; dosing 1.0 mM $Fe^{2+}$+0.5 mM $Al^{3+}$.

Influent flow rate: Q=1.0 L/hr, correspondingly, HRT=6 hr.

Results

At HRT=6 hr, the system achieved only about 8% nitrate removal+13% selenate removal.

In the absence of the involvement of ZVI, the augmented $Al^{3+}/Fe^{2+}$ reagent alone or even with some FeOx phases could not effectively remove either nitrate or selenate. In the absence of ZVI involvement, the mixed $Al^{3+}/Fe^{2+}$ solution could proceed mainly through the commonly known hydrolysis process, followed by the flocculation and precipitation/oxidation process. These processes appear ineffective in removing either nitrate or selenate. This test demonstrates that the interaction of ZVI with $Al^{3+}/Fe^{2+}$ in conjunction with the involvement of magnetite phase were responsible for the rapid selenate removal.

While the preferred embodiment of the invention has been illustrated and described, it will be appreciated that various changes can be made therein without departing from the spirit and scope of the invention.

The invention claimed is:

1. A method for reducing the concentration of one or more contaminants in water, comprising:
    adding a mixed aluminum (III) and iron (II) salt solution to water containing one or more contaminants in contact with a zero-valent iron media comprising (a) a reactive solid comprising zero-valent iron and one or more iron oxide minerals in contact therewith and (b) magnetite to provide an aqueous reaction medium, and
    mixing the aqueous reaction medium for a period of time sufficient to reduce the concentration of one or more of the contaminants.

2. The method of claim 1, wherein the mixed aluminum (III) and iron (II) salt solution is formed from dissolving an aluminum (III) salt and an iron (II) salt in water.

3. The method of claim 1, wherein the molar ratio of aluminum (III) to iron (II) in the mixed aluminum (III) and iron (II) salt solution is from 0.05:1 to 1:3.

4. The method of claim 1, wherein the concentration of aluminum (III) in the mixed aluminum (III) and iron (II) salt solution is from about 50 to about 200 mM.

5. The method of claim 1, wherein the concentration of iron (II) in the mixed aluminum (III) and iron (II) salt solution is from about 50 to about 200 mM.

6. The method of claim 1, wherein the concentration of aluminum (III) in the mixed aluminum (III) and iron (II) salt solution is about 50 mM and the concentration of iron (II) in the mixed aluminum (III) and iron (II) salt solution is about 100 mM.

7. The method of claim 1, wherein the mixed aluminum (III) and iron (II) salt solution is added continuously.

8. The method of claim 2, wherein the aluminum (III) salt is selected from the group consisting of aluminum chloride, aluminum sulfate, aluminum fluoride, aluminum bromide, aluminum iodide, aluminum nitrate, aluminum phosphate, aluminum carboxylates, and mixtures thereof.

9. The method of claim 2, wherein the iron (II) salt is selected from the group consisting of ferrous chloride, ferrous sulfate, ferrous bromide, ferrous fluoride, ferrous iodide, ferrous carboxylates, and mixtures thereof.

10. The method of claim 1, wherein the one or more iron oxide minerals of the reactive solid comprise magnetite.

11. The method of claim 1, wherein the reactive solid comprises a plurality of particles.

12. The method of claim 1, wherein adding the mixed aluminum (III) and iron (II) salt solution to the water containing one or more contaminants in contact with a zero-valent iron media occurs in a reactor.

13. The method of claim 12, wherein the reactor is a packed bed or a fluidized bed.

14. The method of claim 12, wherein the reactor is continuous-flow reactor.

15. The method of claim 1 further comprising a pre-conditioning step comprising, treating zero-valent iron with a solution comprising an oxidant and ferrous iron to provide the zero-valent iron media.

16. The method of claim 1, wherein the one or more contaminants is selenate.

17. The method of claim 1, wherein the one or more contaminants are selected from the group consisting of arsenic, aluminum, antimony, beryllium, cobalt, lead, cadmium, chromium, silver, zinc, nickel, molybdenum, thallium, vanadium, and ions and oxyanions thereof; borates, nitrates, bromates, iodates, and periodates; and mixtures thereof.

18. The method of claim 1, wherein the water is selected from flue gas desulfurization wastewater, industrial waste stream, oil refinery waste, tail water of a mining operation, stripped sour water, surface water, ground water, and an influent stream.

19. In a method for reducing the concentration of one or more contaminants in water comprising contacting the water with a zero-valent iron media comprising (a) a reactive solid comprising zero-valent iron and one or more iron oxide minerals in contact therewith and (b) magnetite, the improvement comprising adding a mixed aluminum (III) and iron (II) salt solution to the water in contact with a zero-valent iron media.

20. A method for selectively reducing the concentration of selenate in the presence of nitrate in a water containing selenate and nitrate, comprising:
   adding a mixed aluminum (III) and iron (II) salt solution to water containing one or more contaminants in contact with a zero-valent iron media comprising (a) a reactive solid comprising zero-valent iron and one or more iron oxide minerals in contact therewith and (b) magnetite to provide an aqueous reaction medium, and
   mixing the aqueous reaction medium for a period of time sufficient to selectively reduce the concentration of selenate in the presence of nitrate.

* * * * *